(12) United States Patent
Wilson et al.

(10) Patent No.: US 11,586,527 B2
(45) Date of Patent: Feb. 21, 2023

(54) AUTOMATED ALGORITHMIC VERIFICATION IN AN EMBEDDED COMPLEX DISTRIBUTED STORAGE ENVIRONMENT

(71) Applicant: EMC IP HOLDING COMPANY LLC, Hopkinton, MA (US)

(72) Inventors: Jeffrey Wilson, Franklin, MA (US); Mordechai Grutman, Newton, MA (US)

(73) Assignee: Dell Products, L.P., Hopkinton, MA (US)

( * ) Notice: Subject to any disclaimer, the term of this patent is extended or adjusted under 35 U.S.C. 154(b) by 70 days.

(21) Appl. No.: 17/246,600

(22) Filed: May 1, 2021

(65) Prior Publication Data

US 2022/0350727 A1 Nov. 3, 2022

(51) Int. Cl.
  *G06F 9/44* (2018.01)
  *G06F 11/36* (2006.01)
(52) U.S. Cl.
  CPC .............................. *G06F 11/3612* (2013.01)
(58) Field of Classification Search
  CPC .................................................. G06F 11/3612
  See application file for complete search history.

(56) References Cited

U.S. PATENT DOCUMENTS

| | | | | |
|---|---|---|---|---|
| 10,877,874 | B2* | 12/2020 | Alluri | G06F 11/3684 |
| 2006/0085681 | A1* | 4/2006 | Feldstein | G06F 11/3692 |
| | | | | 714/25 |
| 2007/0157174 | A1* | 7/2007 | Gebhardt | G06F 11/3624 |
| | | | | 717/124 |
| 2010/0153927 | A1* | 6/2010 | Stall | G06F 11/3624 |
| | | | | 717/130 |
| 2018/0129592 | A1* | 5/2018 | Li | G06F 11/3684 |

* cited by examiner

*Primary Examiner* — Hang Pan
(74) *Attorney, Agent, or Firm* — Anderson Gorecki LLP

(57) ABSTRACT

A model of an algorithm to be tested is created based on the steps that the algorithm uses to implement a particular function. The model is used by an algorithm verification process to control execution of the application under test. Stubs (small pieces of code) are inserted into the application under test which are used to control execution of the algorithm to determine the result of execution of the algorithm at various locations. The remote stubs enable the testing framework to control execution of the application, stop execution of the application, view data structures associated with the application, freeze system behavior, induce multi-layered dependent sequences, analyze logs, change system flow based on test requests, examine internal data structures as part of the tests, and verify that each method and the combined results of the methods are as expected, based on the original definition of the application algorithm.

16 Claims, 8 Drawing Sheets

AUTOMATED ALGORITHMIC VERIFICATION IN AN EMBEDDED COMPLEX DISTRIBUTED STORAGE ENVIRONMENT

FIELD

This disclosure relates to computing systems and related devices and methods, and, more particularly, to automated algorithmic verification in an embedded complex distributed storage environment.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

An embedded complex distributed storage environment includes a methodology for analyzing and verifying embedded system code components, which makes it possible to verify that the logical code flows and data structures are functioning as intended. In some embodiments, a testing framework is built outside of an embedded complex distributed storage system, and embedded system remote stubs are included in the application to be tested. A model of the algorithm to be tested is created based on the steps that the algorithm uses to implement a particular function. The model is implemented as script that will be used by an algorithm verification process to control execution of the algorithm implementing the application under test. Stubs are inserted into the application under test which are used to cause execution of the algorithm to pause at particular points in execution, so that it is possible to determine the result of the execution of the algorithm under test at various locations.

In some embodiments the stubs are small pieces of code that can be called by the script, but otherwise would not execute in connection with execution of the algorithm. System calls (syscalls) can be used to communicate between the script and the stubs, but other communication mechanisms can be used as well. The remote stubs enable the testing framework to control execution of the application, stop execution of the application, view data structures associated with the application, freeze system behavior, induce multi-layered dependent sequences, analyze logs, change system flow based on test requests, examine internal data structures as part of the tests, and verify that each method and the combined results of the methods are as expected, based on the original definition of the application algorithm.

DETAILED DESCRIPTION

Aspects of the inventive concepts will be described as being implemented in connection with a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, and/or computer instructions that are stored on a non-transitory tangible computer-readable medium and implemented by multi-purpose tangible processors, and any combinations thereof.

Figure 1:
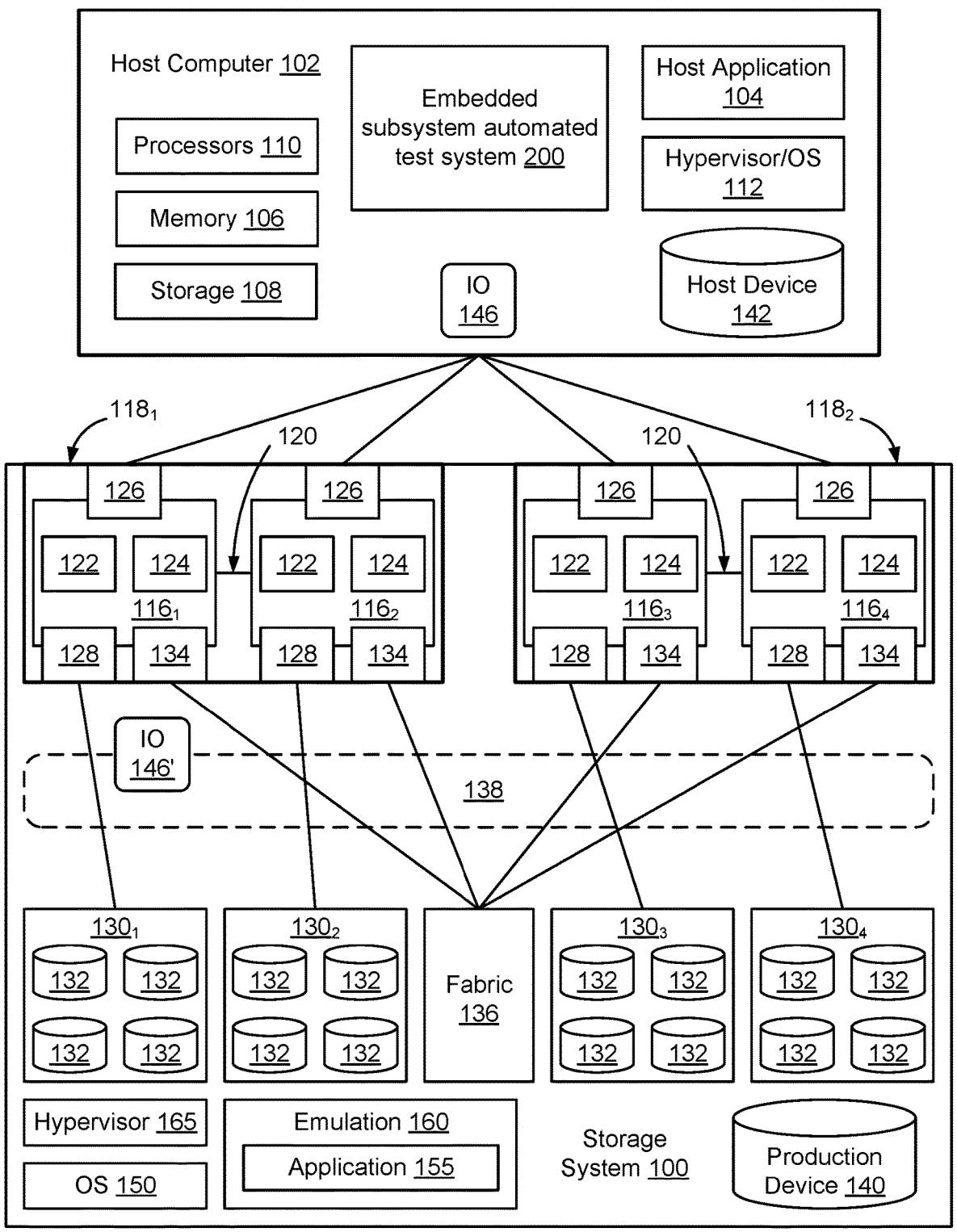
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. One example of a host application 104 is a storage system management application 150, which is discussed in greater detail below.

In the illustrated example the host computer 102 is a server with volatile memory 106, persistent storage 108, one or more tangible processors 110, and a hypervisor or OS (Operating System) 112. The processors 110 may include one or more multi-core processors that include multiple CPUs (Central Processing Units), GPUs (Graphical Processing Units), and combinations thereof. The volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers, and although an external host computer 102 is illustrated, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM, and in some embodiments is used to implement a cache for processors 122. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$ using a PCIe (Peripheral Component Interconnect express) bus, or may be connected to the compute nodes $116_1$-$116_4$, for example, by an IB (InfiniBand) bus or IB fabric switch 136.

In some embodiments, each compute node 116 also includes one or more CAs (Channel Adapters) 134 for communicating with other compute nodes 116 directly or via an interconnecting fabric 136. An example interconnecting fabric may be implemented using InfiniBand.

Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access) such that each compute node 116 may implement atomic operations on the local volatile memory 124 of itself and on the local volatile memory 124 of each other compute node 116 in the storage system 100.

The storage system 100 maintains data for the host applications 104 running on the host computer 102. For example, host application 104 may write host application data to the storage system 100 and read host application data from the storage system 100 in order to perform various functions. Examples of host applications 104 may include, but are not limited to, file servers, email servers, block servers, databases, and storage system management application 150.

Logical storage devices are created and presented to the host application 104 for storage of the host application data. For example, as shown in FIG. 1, in some embodiments a production device 140 and a corresponding host device 142 are created to enable the storage system 100 to provide storage services to the host application 104. The host device 142 is a local (to host computer 102) representation of the production device 140. Multiple host devices 142 associated with different host computers 102 may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by one or more of the compute nodes $116_1$-$116_4$ at non-contiguous addresses in shared global memory 138 and on various different managed drives 132 on storage system 100.

In some embodiments, the storage system 100 maintains metadata that indicates, among various things, mappings between the production device 140 and the locations of extents of host application data in the shared global memory 138 and the managed drives 132. In response to an IO (Input/Output) command 146 from the host application 104 to the host device 142, the hypervisor/OS 112 determines whether the IO 146 can be serviced by accessing the host computer memory 106. If that is not possible then the IO 146 is sent to one of the compute nodes $116_1$-$116_4$ to be serviced by the storage system 100.

In the case where IO 146 is a read command, the storage system 100 uses metadata to locate the commanded data, e.g. in the shared global memory 138 or on managed drives 132. If the commanded data is not in the shared global memory 138, then the data is temporarily copied into the shared global memory 138 from the managed drives 132 and sent to the host application 104 via one of the compute nodes $116_1$-$116_4$. In the case where the IO 146 is a write command, in some embodiments the storage system 100 copies a block being written into the shared global memory 138, marks the data as dirty, and creates new metadata that maps the address of the data on the production device 140 to a location to which the block is written on the managed drives 132. Writing data from shared global memory to managed drives 132 is referred to herein as "destaging" the data. The shared global memory 138 may enable the production device 140 to be reachable via all of the compute nodes $116_1$-$116_4$ and paths, although the storage system 100 can be configured to limit use of certain paths to certain production devices 140.

Not all volumes of data on the storage system are accessible to host computer 104. When a volume of data is to be made available to the host computer, a logical storage volume, also referred to herein as a TDev (Thin Device), is linked to the volume of data, and presented to the host computer 104 as a host device 142.

Storage system 100 includes applications 155 configured to execute in emulations 160. Multiple applications 155 may be executing in emulations 160 instantiated in the context of the storage system 100. In some embodiments, a hypervisor 165 abstracts the physical resources of the storage system 100 from emulations 160, and allocates physical resources of storage system 100 for use by the emulations 160. Each emulation 160 has an emulation operating system and one or more application processes 155 running in the context of the emulation operating system.

Many types of applications 155 may execute in emulations 160 on storage system 100. Example types of applications 155 may be configured to implement virtual network attached storage servers, implement data mirroring to other similarly configured storage systems, manage the storage resources 132 or the use of global memory, etc. When an application 155 is created or changed, it is difficult to verify and validate the algorithmic code flows, concepts, dependent data structures, and the dependent effects of dynamic operations and expected results of these manipulations, due to the complexity and distributed nature of such systems.

Conventionally, applications are tested by instructing the application to perform a particular function, and then looking at the application result. This allows the result of the application to be verified, but does not provide any insight as to how the application achieved that result. For example, an application may be instructed to create a storage volume on the storage system. After executing, the list of storage volumes on the storage system 100 may be checked to verify that the application created a new storage volume. However, the manner in which the application created the storage volume is not able to be determined—it is possible that the application created two storage volumes and then deleted one of the newly created storage volumes. The end result is that the application created a storage volume, but the manner in which the application created the storage volume might not be as anticipated or as desired.

As another example, an application 155 may be created that is designed to use a particular algorithm to reduce the number of pages of memory that are used to store data. In this example, it will be assumed that the algorithm implementing the application 155 uses multiple steps, such as first looking for empty pages of data and removing those, then looking for nodes that can be consolidated and implementing the node consolidation, etc. Normal testing would test this application at the feature level, and determine that the application worked because it was able to consolidate 1000 pages down to 800 pages. By testing the algorithm, rather than the feature, it is possible to determine that the first step of the algorithm reduced the storage usage by a first percentage, the second step reduced storage usage by another percentage, etc. That makes it possible to debug the algorithm, because it is possible that the algorithm is obtaining the result that is desired, but is doing it in a way that is not desired. In this example, it is possible that by looking at the manner in which the algorithm is operating, it would be possible to adjust the algorithm to cause the application to be able to consolidate the same 1000 pages down to 700 pages.

According to some embodiments, a methodology for analyzing and verifying embedded system code components is provided, which makes it possible to verify that the logical code flows and data structures are functioning as intended. A variety of deterministic and randomization techniques are used to verify the manner in which the application is executing. In some embodiments, a testing framework is built outside of an embedded complex distributed storage system, and embedded system remote stubs are included in the application to be tested. The remote stubs enable the testing framework to control execution of the application, stop execution of the application, view data structures associated with the application, freeze system behavior, induce multi-layered dependent sequences, analyze logs, change system flow based on test requests, examine internal data structures as part of the tests, and verify that each method and the combined results of the methods are as expected, based on the original definition of the application algorithm.

In some embodiments, a model of the algorithm is created based on the steps that the algorithm uses to implement a particular function. The model is implemented as script that will be used by an algorithm verification process 210 to control execution of the algorithm implementing the application under test 280. Stubs 290 are inserted into the application under test which are used to cause execution of the algorithm to pause at particular points in execution, so that it is possible to determine the result of execution of the algorithm under test 280 at various locations. In some embodiments the stubs 290 are small pieces of code that can be called by the script, but otherwise would not execute in connection with execution of the algorithm. System calls (syscalls) can be used to communicate between the script and the stubs, but other communication mechanisms can be used as well.

Figure 2:
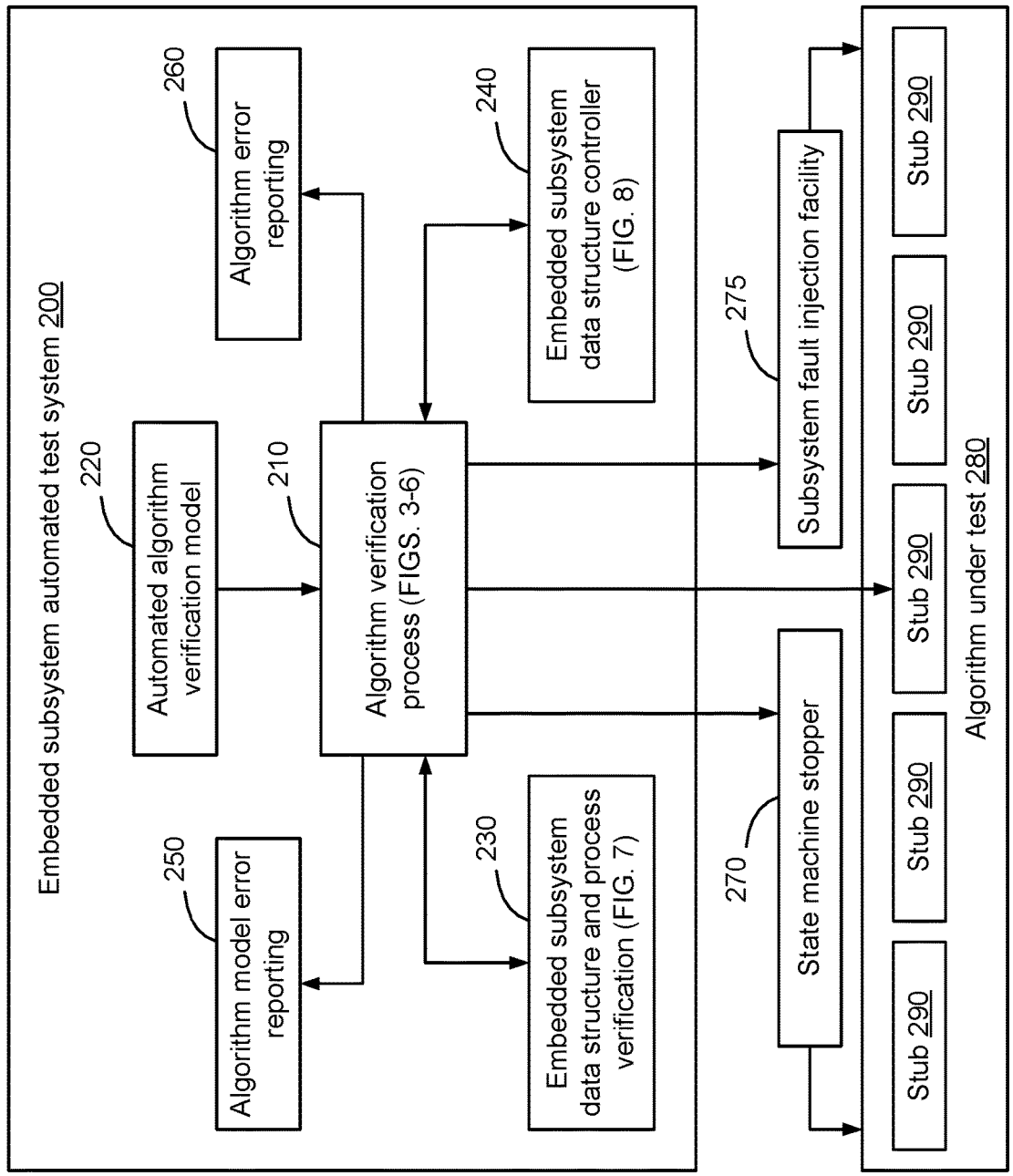
FIG. 2 is a functional block diagram of an example embedded subsystem automated test system configured to implement automated algorithmic verification in an embedded complex distributed storage environment, according to some embodiments.

FIG. 2 is a functional block diagram of an example embedded subsystem automated test system 200 configured to implement automated algorithmic verification in an embedded complex distributed storage environment, according to some embodiments. As shown in FIG. 2, in some embodiments an embedded subsystem automated test system 200 includes an algorithm verification process 210. The algorithm verification process 210 controls execution of the application under test 280 based on an algorithm verification model 220. The algorithm verification process 210 controls execution of the algorithm under test 280 via stubs 290. Other embedded firmware components of the storage system 100, such as a state machine stopper 270 and a subsystem fault injection facility 275 may also be used to control aspects of execution of the application under test 280.

In some embodiments, the embedded subsystem automation test system 200 includes an embedded subsystem data structure and process verification module 230. Additional details associated with execution of the embedded subsystem data structure and process verification module 230 are provided in connection with FIG. 7. Additionally, in some embodiments, the embedded subsystem automation test system 200 includes an embedded subsystem data structure controller 240. Additional details associated with execution of the embedded subsystem data structure controller 240 are provided in connection with FIG. 8.

If an error is detected by the algorithm verification process 210, there are two possible sources of the error: the error can be due to an error in the automated algorithm verification model 220, or it may be that there is an error in the algorithm under test 280. In some embodiments, the embedded subsystem automation test system 200 includes an algorithm model error reporting system 250 to report errors in the test automation model 220, and includes an algorithm error reporting system 260 to report errors in the algorithm under test 280. Optionally, these two error reporting systems 250, 260, may be consolidated.

Figure 3:
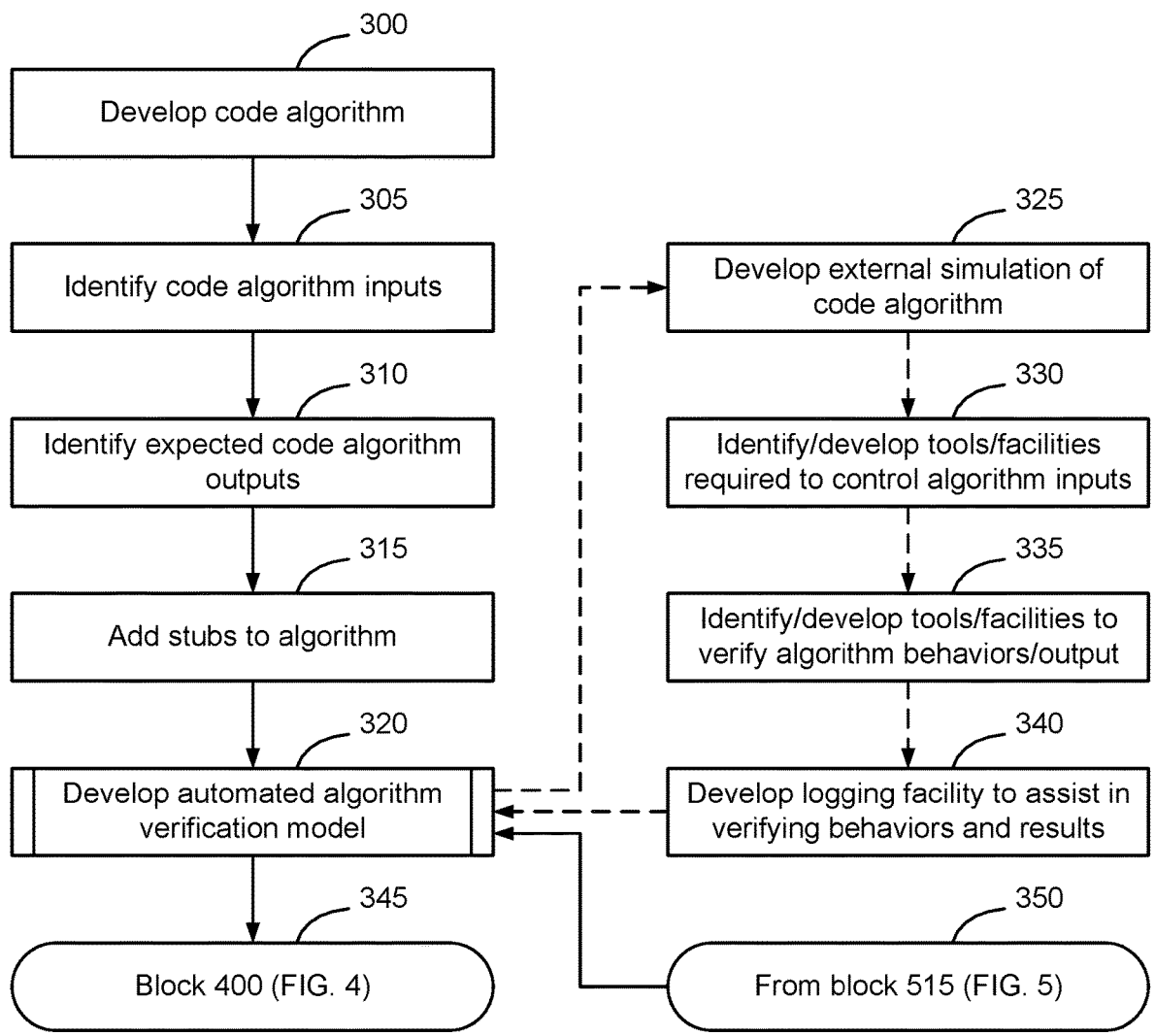
FIGS. 3-6 collectively form a flow chart of an example process of automated algorithmic verification in an embedded complex distributed storage environment, according to some embodiments.
Figure 4:
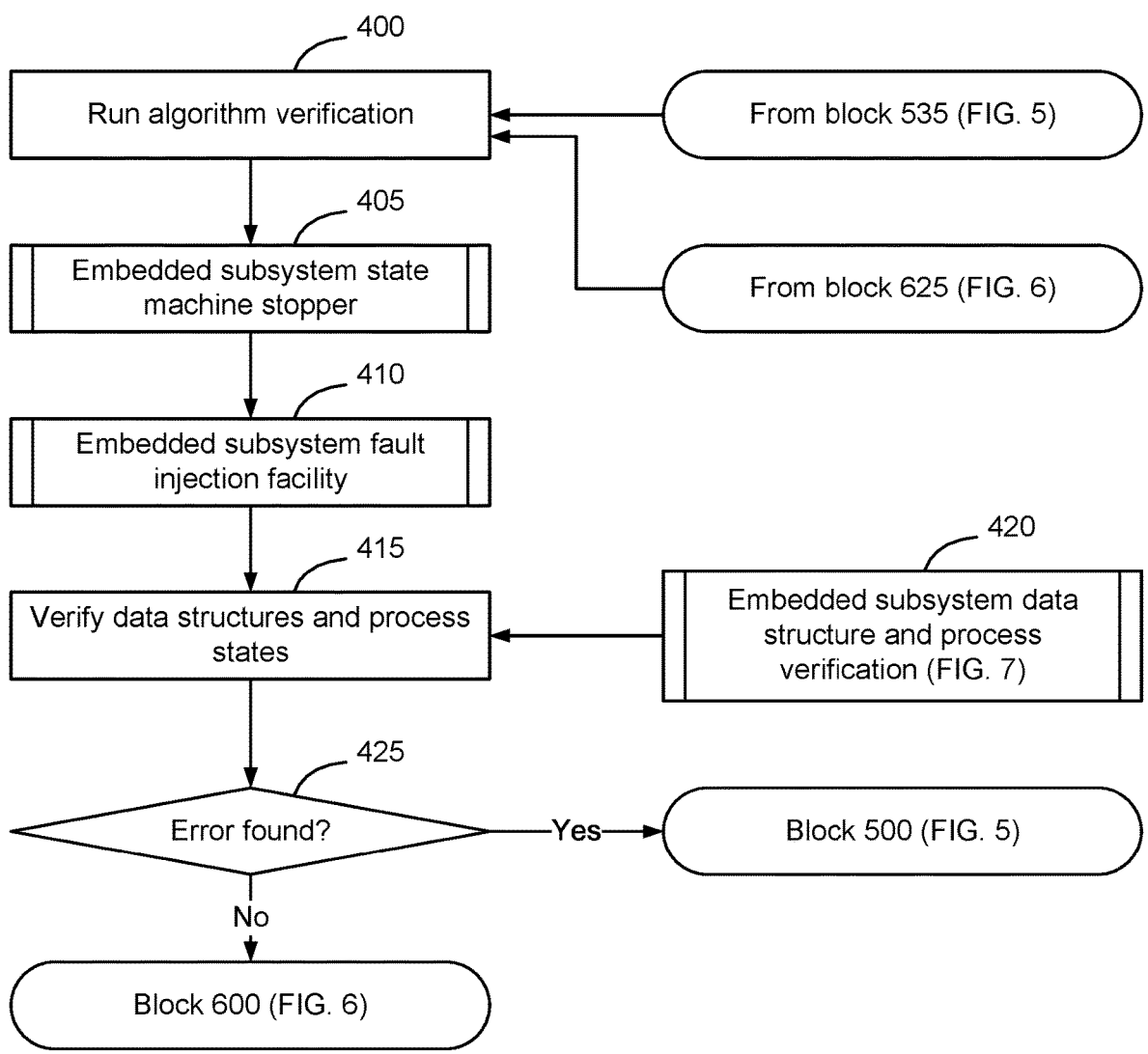
Figure 5:
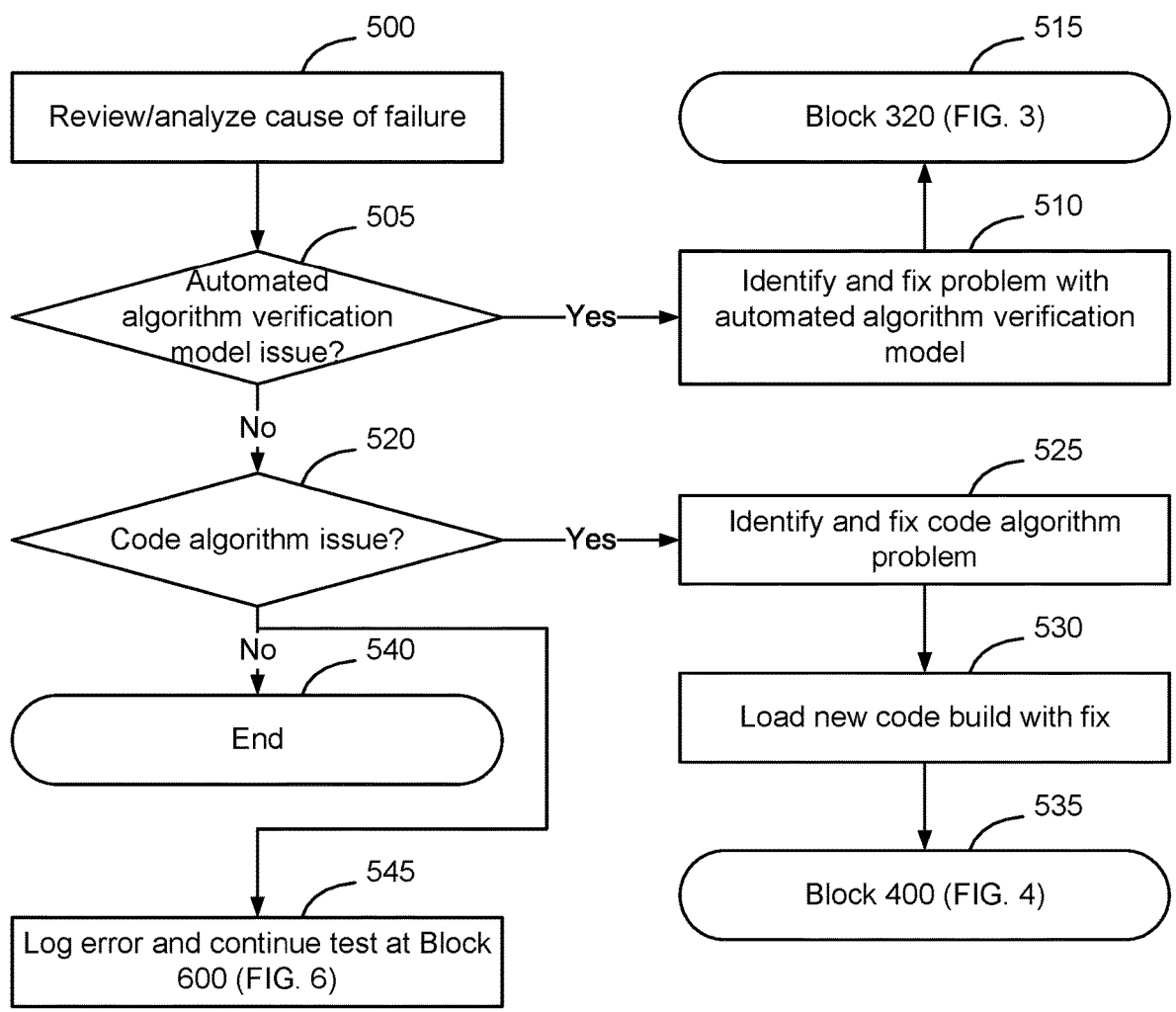
Figure 6:
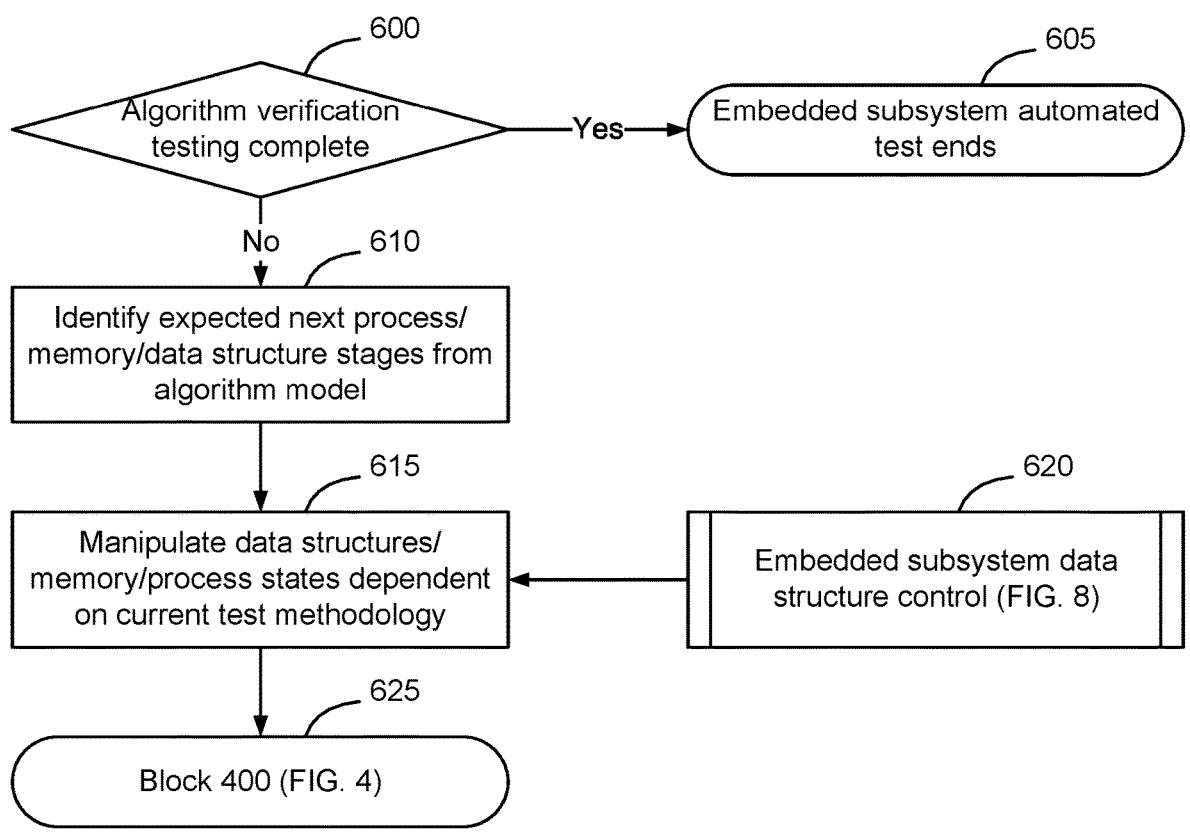

FIGS. 3-6 collectively form a flow chart of an example process of automated algorithmic verification in an embedded complex distributed storage environment, according to some embodiments. FIG. 3 shows a process of creation of an automated algorithm verification model 220, that is used by the algorithm verification process 210 to test execution of the algorithm under test 280. FIG. 4 shows a process of testing execution of the algorithm under test 280 by the algorithm verification process 210 based on the automated algorithm verification model 220. FIG. 5 shows a portion of the embedded algorithm test process when an error is detected by the algorithm verification process. FIG. 6 shows a portion of the embedded algorithm test process when an error is not detected by the algorithm verification process.

FIG. 3 shows a process of creation of an automated algorithm verification model 220, that is used by the algorithm verification process 210 to test execution of the algorithm under test 280. As shown in FIG. 3, initially a code algorithm for an application 155 is created (block 300) which will be implemented as the algorithm under test 280, that is to be tested by the algorithm verification process 210. As part of the algorithm development process, the code algorithm inputs are identified (block 305) and the expected code algorithm outputs are identified (block 310). Stubs 290 are added to the algorithm under test 280 (block 315) at appropriate places to enable execution of the algorithm under test to be paused, so that the data structures and other state variables associated with the algorithm under test 280 can be determined at those points in execution of the algorithm under test 280.

An automated algorithm verification model 220 is then created based on the developed coded algorithm (block 320). The automated algorithm verification model 220 may be implemented as script, for example. In some embodiments, the automated algorithm verification model 220 is created by developing an external simulation of the code algorithm (block 325). The tools and facilities that are required to control the algorithm inputs are identified and developed (block 330). As part of this, the locations of the necessary stubs 290 are identified and stubs 290 are added to the algorithm (block 315) if not previously included in the algorithm under test 280. The tools and facilities that are needed to verify the algorithm behaviors and outputs are also identified and developed (block 335). A logging facility may also be developed to assist in verifying the behaviors and results of the algorithm under test 280 (block 340).

Once the automated algorithm verification model 220 has been created, the model can be used by the algorithm verification process to test the algorithm under test 280. Accordingly, the process then continues at block 400 (FIG. 4).

FIG. 4 shows a process of testing execution of the algorithm under test 280 by the algorithm verification process 210 based on the automated algorithm verification model 220. At block 400, the algorithm verification process is initiated. The algorithm verification process can use stubs 290, an embedded subsystem state machine stopper 270 (block 405), and an embedded subsystem fault injection facility 275 (block 410) to control execution of the algorithm under test 280. The automated algorithm verification model 220 specifies to the algorithm verification process 210 when to verify the data structures and process states of the algorithm under test 280 (block 415) and the expected data structures and process states. In some embodiments, an embedded subsystem data structure and process verification subsystem 230 is used to verify the data structures and process states (block 420). Additional details about an example method of embedded subsystem data structure and process verification are provided below in connection with FIG. 7.

The algorithm verification process then compares the data structures and process states of the algorithm under test with the expected data structures and process states of the automated algorithm verification model 220, and determines whether an error has occurred (block 425). If an error is identified (a determination of YES at block 425) the process continues to block 500 of FIG. 5. If the data structures and process states of the application match the data structures and process states of the automated algorithm verification model, the algorithm verification process determines that no error has occurred (a determination of NO at block 425) and the process continues to block 600 of FIG. 6.

FIG. 5 shows a portion of the embedded algorithm test process when an error is identified by the algorithm verification process 210. As shown in FIG. 5, when an error is detected, the algorithm verification process will review and analyze the cause of the failure (block 500). As noted above, if the data structures or process states of the algorithm under test 280 do not match the data structures or process states of the automated algorithm verification model, the mismatch may be due to an error in the model 220 or due to an error in the algorithm 280. Accordingly, the algorithm verification process 210 determines whether there is an error in the automated algorithm verification model 220 (block 505). If the algorithm verification process 210 determines that there is an error in the automated algorithm verification model 220 (a determination of YES at block 505), the problem with the automated algorithm verification model is identified and fixed in the automated algorithm verification model (block 510). In some embodiments, this causes the process to return to block 320 to enable the automated algorithm verification model to be adjusted (block 515). In some embodiments, the error in the automated algorithm verification model is output using the algorithm model error reporting module 250.

If the error does not appear to be based on a problem with the automated algorithm verification model 220 (a determination of NO at block 505), the algorithm verification process 210 determines whether the error is due to an issue in the code algorithm used by the algorithm under test 280 (block 520). If the algorithm verification process 210 determines that the error is due to an issue in the code algorithm used by the algorithm under test 280 (a determination of YES at block 520), the problem in the algorithm under test 280 is identified and fixed (block 525). The new code that is built to correct the algorithm under test 280 is then loaded (block 530) and the process returns to block 400 of FIG. 4, where testing of the new code of the algorithm under test 280 is initiated (block 535). In some embodiments, the error in the algorithm code is output using the algorithm error reporting module 260.

If the error is not due to a problem in the model (a determination of NO at block 505) and is not due to a problem in the code used to implement the algorithm under test (a determination of NO at block 520), the algorithm verification process 210 is not able to isolate the cause of the problem and the test ends (block 540). Alternatively, the algorithm verification process 210 may log the error and continue testing the algorithm under test 280 at block 600 (block 545).

In FIG. 5, an implementation is shown in which the algorithm verification test process initially checks to determine if there is an error in the automated algorithm verification model (block 505) before checking to determine if there is an error in the code (block 520). It should be understood that the order in which these checks are performed (blocks 505, 520) can be reversed, depending on the particular implementation.

FIG. 6 shows a portion of the embedded algorithm test process when an error is not detected by the algorithm verification process (a determination of NO at block 425 of FIG. 4). If an error is not identified at block 425, the lack of an error indicates that the data structures and process states of the algorithm under test 280 matched the expected data structures and process states of the automated algorithm verification model 220, and the algorithm verification process should continue to test the next portion of the algorithm under test 280.

Accordingly, at block 600 the algorithm verification process 210 checks to determine if algorithm verification testing is complete. If the algorithm verification testing is complete (a determination of YES at block 600) the embedded subsystem automated test ends (block 605). If the algorithm verification testing is not complete (a determination of NO at block 600) the algorithm verification process identifies the next expected process, memory, and data structure stages from the automated algorithm verification model 220 (block 615). The algorithm verification process will then manipulate the data structures, memory, and process states dependent on the current test methodology to simulate an operation on the algorithm under test 280 (block 615). In some embodiments an embedded subsystem data structure control process (block 620) is used by the algorithm verification process 210 to manipulate the data structures, memory, and process states in block 615. Additional details of an example method of embedded subsystem data structure control are provided in connection with FIG. 8. The process then continues to block 400 of FIG. 4 where execution of the algorithm verification process continues on the algorithm under test 280. This process iterates until testing is completed on the algorithm under test (a determination of YES at block 600).

Figure 7:
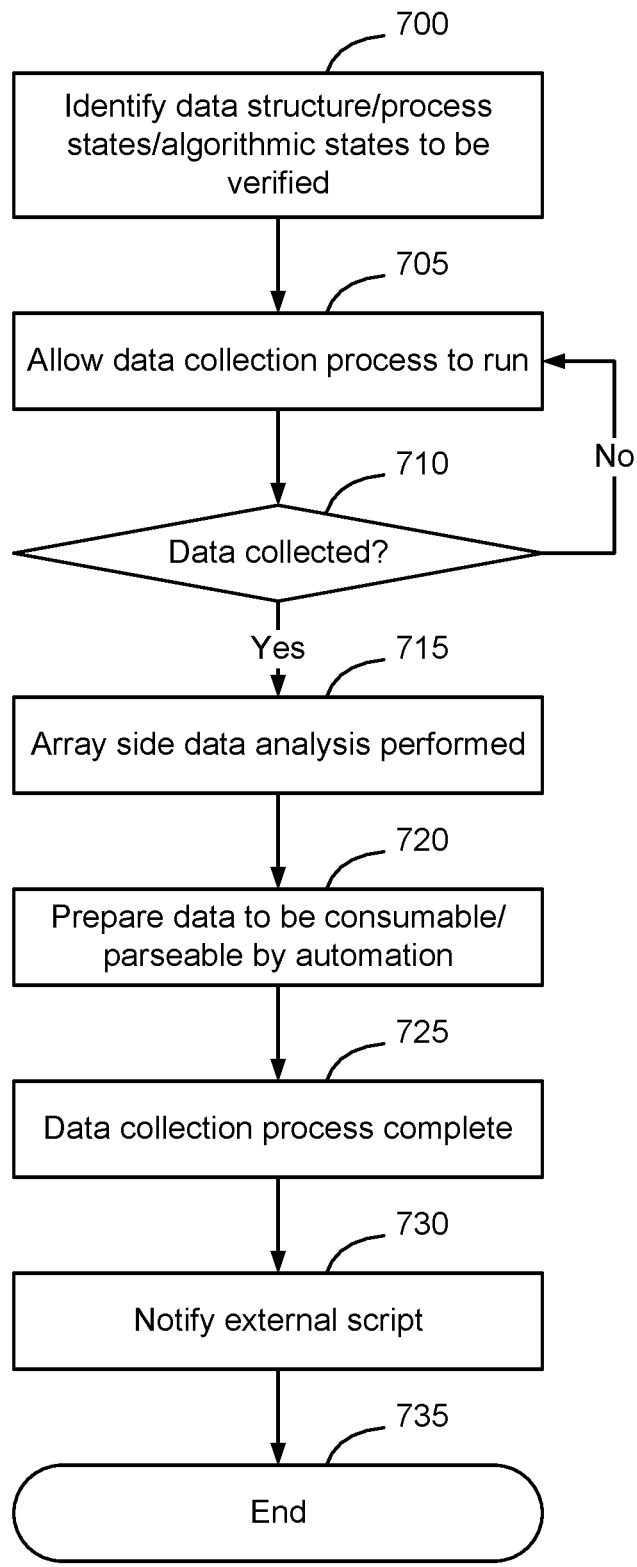
FIG. 7 is a flow chart of an example method of embedded subsystem data structure and process verification, according to some embodiments.

FIG. 7 is a flow chart of an example method of embedded subsystem data structure and process verification that may be used to verify data structures and process states at block 415 of FIG. 4, according to some embodiments. As shown in FIG. 7, in some embodiments the method of embedded subsystem data structure and process verification includes identifying the data structure, process states, and algorithmic states that need to be verified at that point in execution of the algorithm under test 280 (block 700). A data collection process is allowed to run (block 705) and a determination is made as to whether all of the required data needed to verify the data structures, process states, and algorithmic states has been collected (block 710). If all the required data has not been collected (a determination of NO at block 710), the data collection process continues to run (block 705).

If all the required data has been collected (a determination of YES at block 710), an array side data analysis is performed (block 715). The data is prepared to be consumable/parseable by automation (block 720) and the data collection process completes (block 725). The external script implementing the algorithm verification process 210 is notified that the data collection process is complete (block 730), and the process ends (block 735). The algorithm verification process 210 then uses the data collected and prepared by the embedded subsystem data structure and process verification module 230 to verify the data structures and process states (block 415) at that point of execution of the algorithm under test 280.

Figure 8:
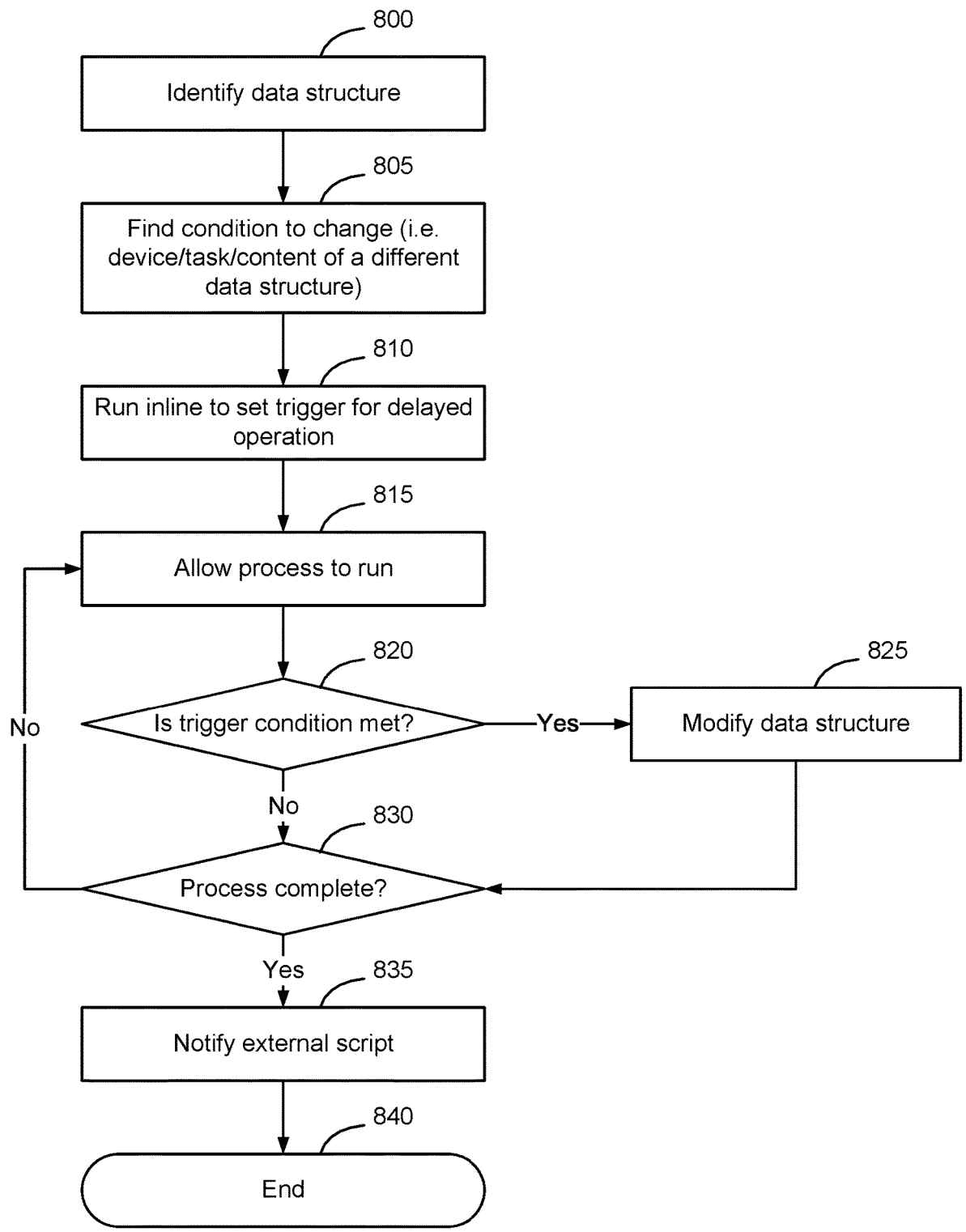
FIG. 8 is a flow chart of an example method of embedded subsystem data structure control, according to some embodiments.

FIG. 8 is a flow chart of an example method of embedded subsystem data structure control, that may be used to manipulate data structures/memory/process states at block 615 of FIG. 6, according to some embodiments. As shown in FIG. 8, in some embodiments the method of embedded subsystem data structure control includes identifying the data structure that needs to be controlled at that point in execution of the algorithm under test 280 (block 800). At block 805, a condition that is to be changed is determined. In some embodiments changing a condition of the data structure includes identifying a device, task, or content of a different data structure that is to be used.

The embedded subsystem data structure control 240 then runs inline to set a trigger for delayed operation (block 810) and the algorithm under test 280 is allowed to run (block 815). A determination is then made as to whether the trigger condition is met (block 820). If the trigger condition is not met (a determination of NO at block 820), a determination is made as to whether the data structure control process is complete (block 830). If the data structure control process is not complete (a determination of NO at block 830) the process continues to run (block 815).

If the trigger condition is met (a determination of YES at block 820) the embedded subsystem data structure control 240 modifies the data structure 825. If the data structure control process is not complete at that point (a determination of NO at block 830), the data structure control process will continue to run (block 815). If the data structure control process is complete after modifying the data structure in block 825 (a determination of YES at block 830), the external script implementing the algorithm verification process 210 is notified (block 835). The algorithm verification process 210 then uses the modified data structure block 615 (FIG. 6). For example, in some embodiments the algorithm verification process 210 will manipulate the data structures, memory, and process states dependent on the current test methodology to simulate an operation on the algorithm under test 280 (block 615).

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible non-transitory computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for automated algorithmic verification in an embedded complex distributed storage environment, the computer program including a set of instructions which, when executed by a computer, cause the computer to perform a method comprising the steps of:
    creating a model of an algorithm to be tested, the model defining expected execution steps of the algorithm, and expected data structures and process states of the algorithm at the expected execution steps, the model being implemented as script configured to be used by an embedded subsystem automation test system to control execution of the algorithm during testing of the algorithm;
    inserting stubs into the algorithm to enable execution of the algorithm to be controlled at the expected execution steps defined in the model, the stubs being small pieces of code that are able to be called by the script, but otherwise do not execute in connection with execution of the algorithm;
    beginning execution of the algorithm;
    using the stubs, by the embedded subsystem automation test system, to pause execution of the algorithm at one of the execution steps defined in the model and determine data structures and process states of the executing algorithm at the paused execution step; and
    comparing the data structures and process states of the executing algorithm at the paused execution step with expected data structures and process states of the algorithm at the paused execution step specified by the model to determine if the algorithm has generated expected data structures and process states at the paused execution step.

2. The non-transitory tangible computer readable storage medium of claim 1, wherein the model of the algorithm to be tested is based on steps that the algorithm uses to implement particular functions.

3. The non-transitory tangible computer readable storage medium of claim 1, wherein communication between the embedded subsystem automation test system and stubs is implemented using system calls.

4. The non-transitory tangible computer readable storage medium of claim 1, further comprising manipulating the data structures of the algorithm by the embedded subsystem automation test system.

5. The non-transitory tangible computer readable storage medium of claim 4, wherein manipulating data structures comprises:
    determining a condition of a first of the data structures to change;
    setting a trigger condition for changing the determined condition;
    allowing the algorithm to execute;
    detecting compliance with the trigger condition; and
    modifying the first data structure upon detecting compliance with the trigger condition.

6. The non-transitory tangible computer readable storage medium of claim 1, wherein the step of comparing the data structures and process states of the executing algorithm at the paused execution step with expected data structures and process states of the algorithm at the paused execution step specified by the model, comprises:
    identifying data structure and process states to be verified;
    collecting data associated with execution of the algorithm;
    preparing the collected data to be consumable by the embedded subsystem automation test system; and
    notifying the embedded subsystem automation test system that the collected data is available.

7. The non-transitory tangible computer readable storage medium of claim 1, further comprising determining, from the step of comparing the data structures and process states, that there is an error in the model of the algorithm.

8. The non-transitory tangible computer readable storage medium of claim 1, further comprising determining, from the step of comparing the data structures and process states, that there is an error in the algorithm.

9. A method of automated algorithmic verification in an embedded complex distributed storage environment, comprising the steps of:
    creating a model of an algorithm to be tested, the model defining expected execution steps of the algorithm, and expected data structures and process states of the algorithm at the expected execution steps, the model being implemented as script configured to be used by an embedded subsystem automation test system to control execution of the algorithm during testing of the algorithm;
    inserting stubs into the algorithm to enable execution of the algorithm to be controlled at the expected execution steps defined in the model, the stubs being small pieces of code that are able to be called by the script, but otherwise do not execute in connection with execution of the algorithm;
    beginning execution of the algorithm;
    using the stubs, by the embedded subsystem automation test system, to pause execution of the algorithm at one of the execution steps defined in the model and determine data structures and process states of the executing algorithm at the paused execution step; and
    comparing the data structures and process states of the executing algorithm at the paused execution step with expected data structures and process states of the algorithm at the paused execution step specified by the model to determine if the algorithm has generated expected data structures and process states at the paused execution step.

10. The method of claim 9, wherein the model of the algorithm to be tested is based on steps that the algorithm uses to implement particular functions.

11. The method of claim 9, wherein communication between the embedded subsystem automation test system and stubs is implemented using system calls.

12. The method of claim 9, further comprising manipulating the data structures of the algorithm by the embedded subsystem automation test system.

13. The method of claim 12, wherein manipulating data structures comprises:
 determining a condition of a first of the data structures to change;
 setting a trigger condition for changing the determined condition;
 allowing the algorithm to execute;
 detecting compliance with the trigger condition; and
 modifying the first data structure upon detecting compliance with the trigger condition.

14. The method of claim 9, wherein the step of comparing the data structures and process states of the executing algorithm at the paused execution step with expected data structures and process states of the algorithm at the paused execution step specified by the model, comprises:
 identifying data structure and process states to be verified;
 collecting data associated with execution of the algorithm;
 preparing the collected data to be consumable by the embedded subsystem automation test system; and
 notifying the embedded subsystem automation test system that the collected data is available.

15. The method of claim 9, further comprising determining, from the step of comparing the data structures and process states, that there is an error in the model of the algorithm.

16. The method of claim 9, further comprising determining, from the step of comparing the data structures and process states, that there is an error in the algorithm.

* * * * *